United States Patent [19]

Weingrad et al.

[11] 3,926,710

[45] Dec. 16, 1975

[54] APPARATUS FOR APPLYING DECALCOMANIA

[75] Inventors: Saul Weingrad, Hillsdale, N.J.; Albert J. Wahl, Fredonia; Richard C. Mucha, Brocton, both of N.Y.; Robert E. Gould, Washington, D.C.

[73] Assignee: Commercial Decal, Inc., Mount Vernon, N.Y.

[22] Filed: Oct. 16, 1972

[21] Appl. No.: 297,631

[52] U.S. Cl. ............... 156/362; 156/540; 156/560; 156/572
[51] Int. Cl.².... B65C 9/06; B65C 9/14; B65C 9/36; B65C 9/40
[58] Field of Search ........... 156/362, 366, 367, 497, 156/540, 560, 572, 570, 230, 235, 285, 297, 89

[56] References Cited
UNITED STATES PATENTS

| | | | |
|---|---|---|---|
| 2,248,213 | 7/1941 | Beck | 156/240 |
| 2,287,579 | 6/1942 | Von Hofe | 156/572 X |
| 2,438,514 | 3/1948 | Miller | 156/89 |
| 2,441,164 | 5/1948 | Miller | 156/212 |
| 2,556,258 | 6/1951 | Denison, Jr. | 156/493 X |
| 2,668,383 | 2/1954 | Germany | 156/230 X |
| 3,029,176 | 4/1962 | Schoonmaker | 156/560 X |
| 3,031,370 | 4/1962 | Shank, Jr. | 156/447 X |
| 3,445,309 | 5/1969 | Milliken | 156/240 X |

Primary Examiner—Douglas J. Drummond
Assistant Examiner—Thomas Bokan
Attorney, Agent, or Firm—Lerner, David, Littenberg & Samuel

[57] ABSTRACT

Apparatus for applying decals to a piece of ware. The apparatus includes a holder for a supply of decals; porous seating surface for temporarily holding a predetermined number of preselectively shaped decals in a predetermined position with respect to the piece of ware to be decorated; transferring mechanism for pick up and transfer of the decals from the supply holder to the porous seating surface; a holder for holding the piece of ware to be decorated and mechanism for moving the ware holder and porous seating surface in decal transfer position. A reduced pressure may be selectively established behind the porous seating surface. The transferring mechanism includes a suction device and the decals are brought into engagement with the porous seating surface before the suction of the transferring device is released. Preferably two identical porous seating surfaces are provided on opposite ends of a rotating support member such that after the decals are initially place on the porous seating surface, such surface is rotated, preferably 180°, to now position decals so they may be engaged by the ware for transfer thereto. Reduced pressure provided behind the porous seating surface is not deactivated until after the ware has been brought into contact therewith. After transfer to the ware, a rolling operation is preferred and thereafter, the backing associated with such decals is removed preferably by a blow off technique. The apparatus guarantees that the decals will be held in proper alignment and registry with respect to the ware to be decorated.

8 Claims, 13 Drawing Figures

APPARATUS FOR APPLYING DECALCOMANIA

FIELD OF THE INVENTION

This invention relates to apparatus and method of applying decalcomania to a piece of ware.

BACKGROUND OF THE INVENTION

In the field of machinery and methods for applying decals to pottery ware, engineers and designers have been searching for a technique for automatically applying decals at a relatively rapid rate while at the same time maintaining the desired registry and alignment of the decal during the application of same to the ware to be decorated. Prior art machinery, represented for example by U.S. Pat. Nos. 2,438,514; 2,441,164; and 2,668,383, while addressing themselves to the problem at hand, are either overly complexed or inherently suffer from alignment problems which are generated when the decals are transferred from their source of supply to the surface of the ware to be ultimately decorated thereby.

SUMMARY OF THE INVENTION

The apparatus of the instant invention employs as the heart thereof a porous seating surface, the external surface of which is configured to resemble the internal configuration of the ware to be decorated. By transfer mechanism to be described in greater detail, the decals are transferred from a supply of same to the external surface of the porous seating surface to thereby establish an intermediate seating position for the decals. Thereafter, the ware is brought into engagement with the seating surface having the decals positioned thereon such the decals may be transferred to the ware. Most preferably, there are actually two identical porous seating surfaces provided on opposite ends of a rotating support member. In operation, once the decals are transferred to one of the porous seating surfaces, it is rotated, preferably 180°, such the decals will be brought into proper position to be engaged by the ware. It will be appreciated that as the ware is removing the decals from the aforementioned seating surface which has been rotated, the other porous seating surface can be receiving the next set of decals. This arrangement materially increases the speed of decal application.

Most preferably, a reduced pressure or vacuum is applied behind the porous seating surface to maintain the decals thereon. Moreover, the transfer mechanism for transferring decals to the porous seating surface is also a suction operating device and the control mechanism is such that the suction in the transfer mechanism will not be relieved until the vacuum behind the vacuum seating surface has firmly and properly positioned the decals on the porous seating surface. Similarly, the vacuum behind the porous seating surface will not be released until after the ware has been brought into engagement with the decals positioned thereon. These provisions guarantee the proper registration of the decals when they are ultimately applied to the ware being decorated.

DETAILED DESCRIPTION OF THE PREFERRED EMBODIMENT

Turning to the figures, there is shown a machine 10 constructed in accordance with the teachings of the instant invention and by which the method hereof may be carried out. The machine hereof includes a frame 12 on which and in a manner to be further described are provided the following arrangements. First, and broadly designated 14 is first means for holding a supply of decals 16. In the preferred embodiment described herein, the machine 10 is designed to apply an annular design ring around a piece of flat ware having a generally flat central portion and an angularly oriented lip portion extending peripherally thereabout. Accordingly, the decals 16 are in the form of three approximately 120° arcuate segments which when ultimately applied to the piece of ware will establish the desired annular design ring.

Thus, the first means 14 for holding a supply of decals comprises a flat plate 18 on which are movably positioned a plurality of upstanding pins 20 arranged to establish the necessary 120° storage bins for stacks of the arcuately segmented decals 16. It will be appreciated that the pins 20 may be preselectively located in any desired configuration to establish storage bins corresponding to the particular decal segments or shapes which have been chosen for application to the ware.

Figure 1:
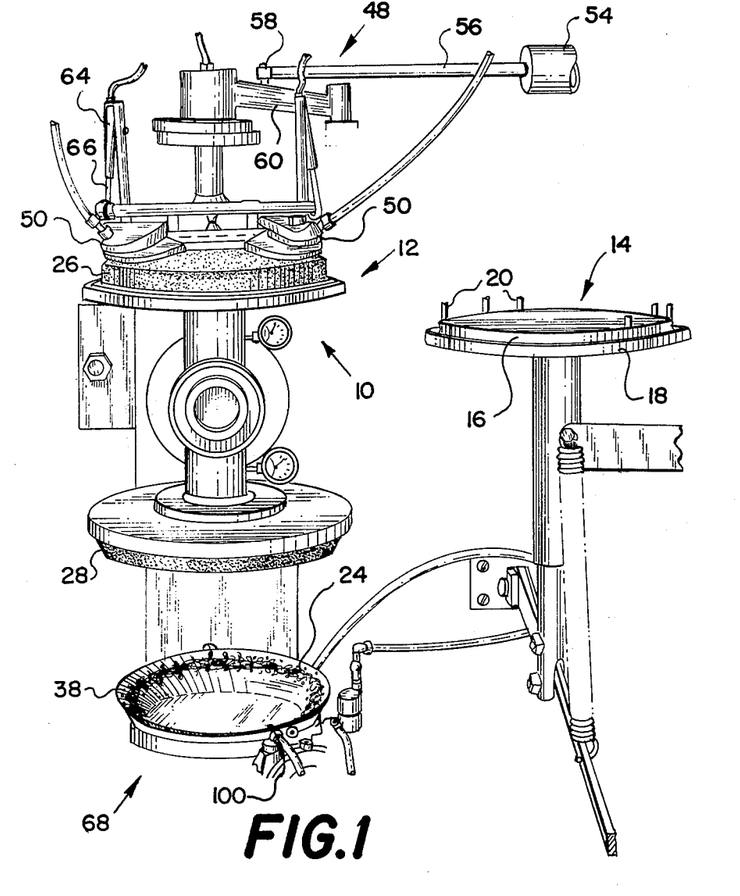
FIG. 1 shows the invention of the instant invention.
Figure 2:
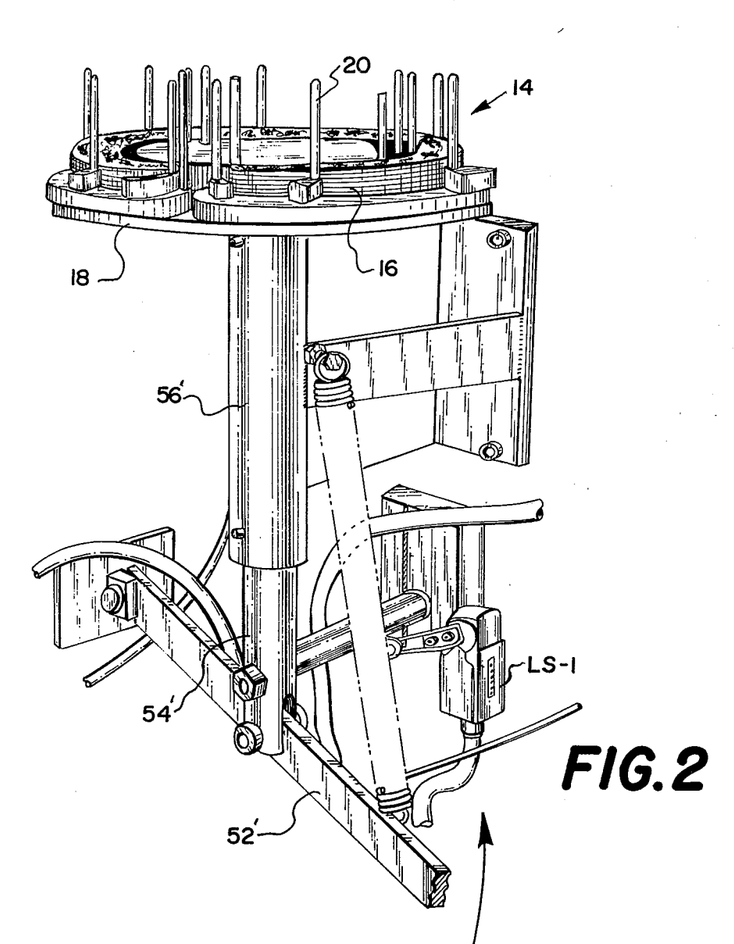
FIG. 2 shows the decal storing arrangement employed in the instant invention.
Figure 3:
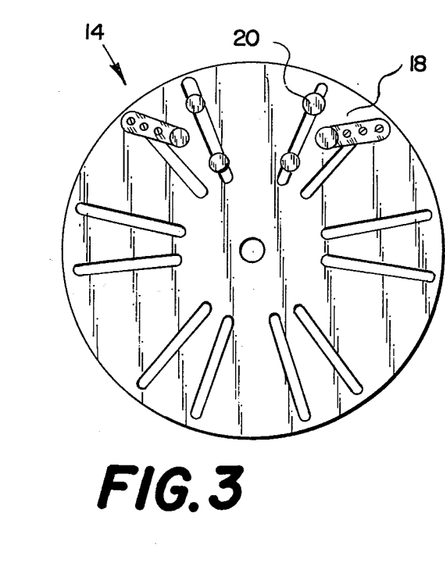
FIG. 3 shows a plan view of a portion of the decal storing arrangement.

As best seen in FIG. 1, the invention hereof further includes second means broadly designated 22 for temporarily holding a predetermined number of preselectively shaped decals in a predetermined position with respect to the piece of ware 24 to be decorated. In the preferred embodiment, the second means 22 includes a pair of identical porous seating surfaces 26 and 28, the external configuration of which is matched to the internal configuration of the ware being decorated. Thus, in the case of ware 24, the shape of the seating surfaces 26 and 28 would be frustroconical having a relatively flat central portion 30 and 32 together with tapered side surfaces 34 and 36 corresponding in angle to the angle of the lip 38 provided on the flat ware 24. The porous seating surfaces 26 and 28 are carried by apertured backing plates 40 and 42 in turn carried at the opposite ends of a cylindrical hollow support member 44. In this manner, with the aid of a vacuum pump and hose (neither of which are shown in the drawings for simplicity of explanation), a reduced pressure may be established behind the seating surfaces 26 and 28 to hold decals thereto in a manner to be further apparent. It should also be noted that the support cylinder 44 is rotatably carried about an axis 46 such that and for purpose to be further described, the porous seating surfaces 26 and 28 may be rotated, preferably in 180° motions, to reverse their position.

Figure 4:
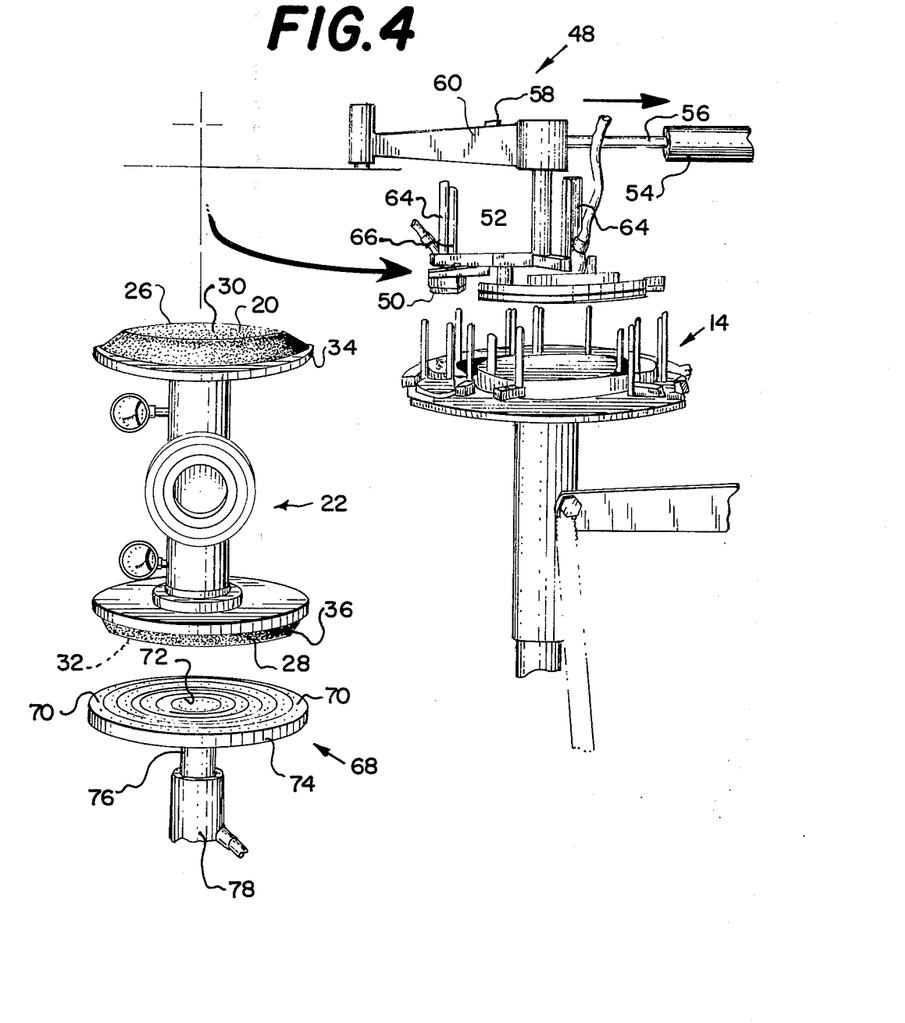
FIGS. 4 through 8 show views of various portions of the machine of the instant invention.
Figures 4A, 4B:
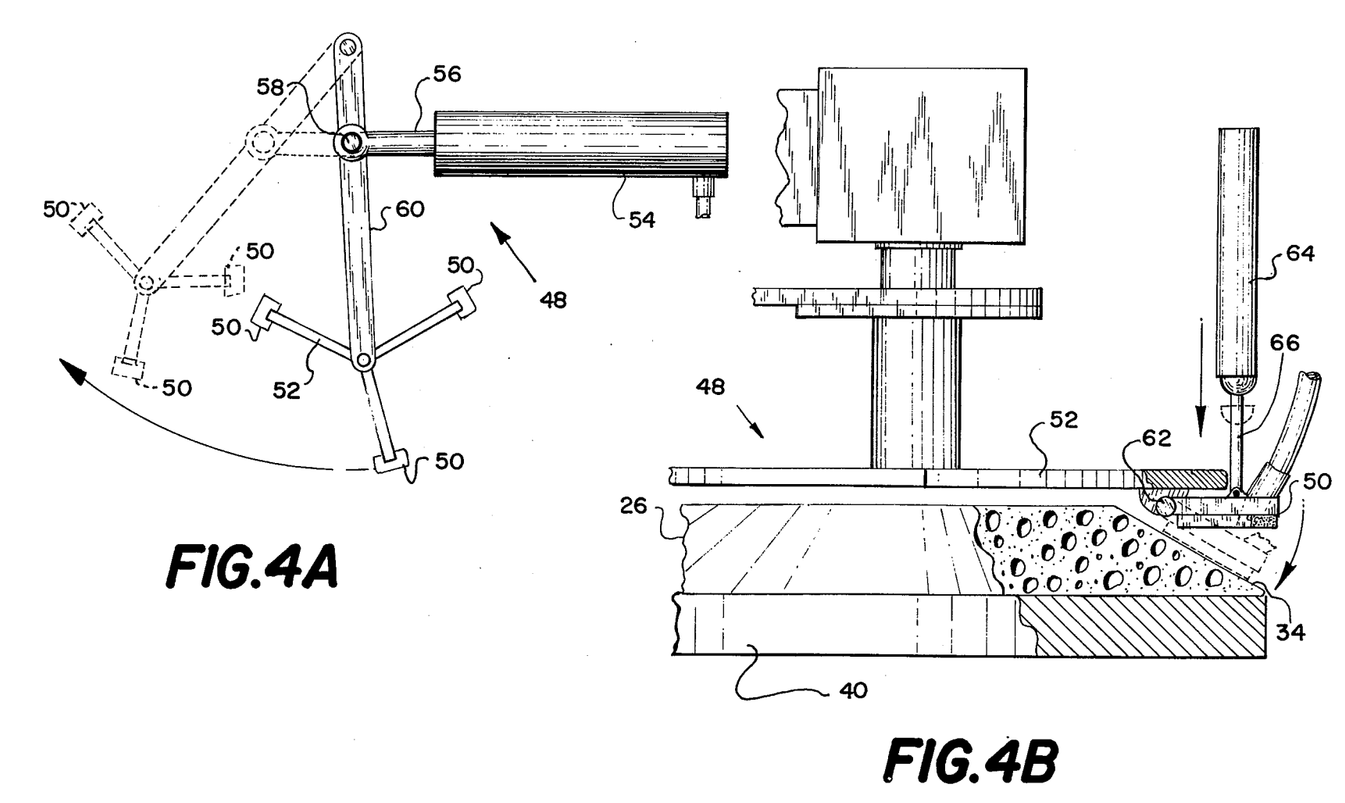
Figure 5:
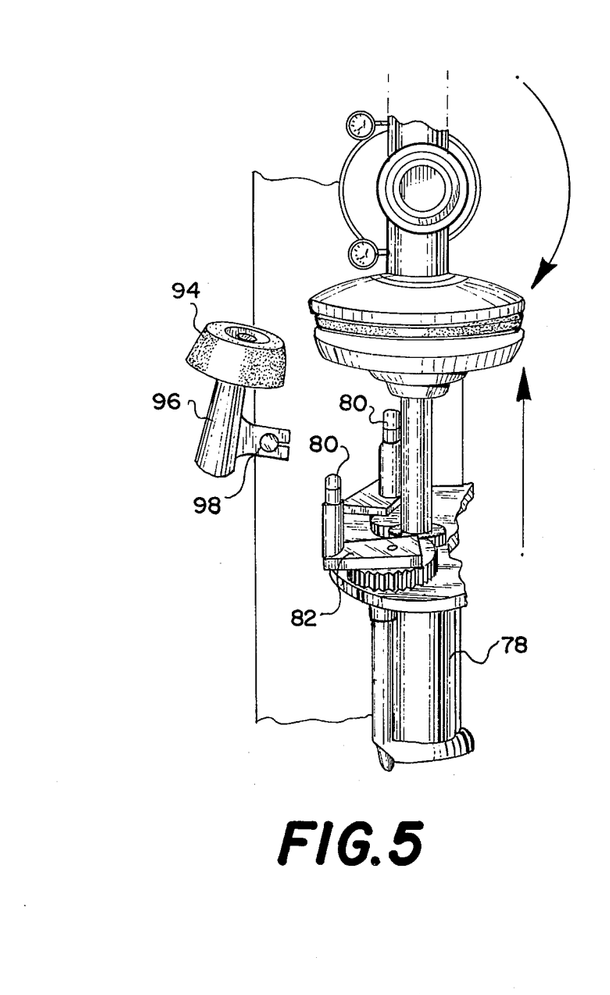
Figure 6:
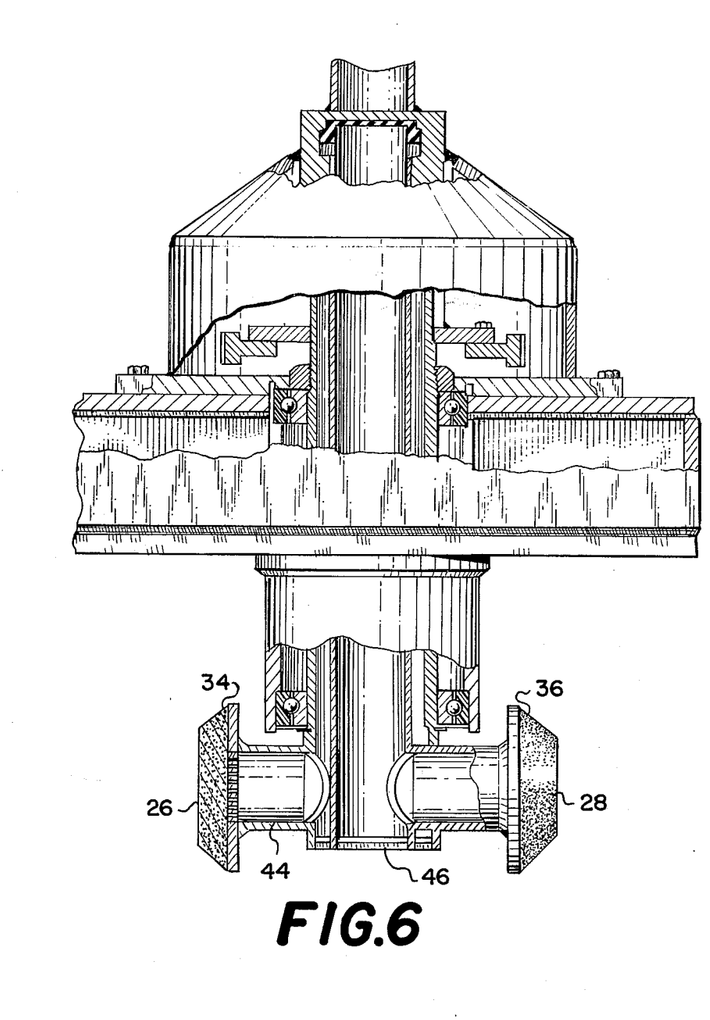
Figure 7:
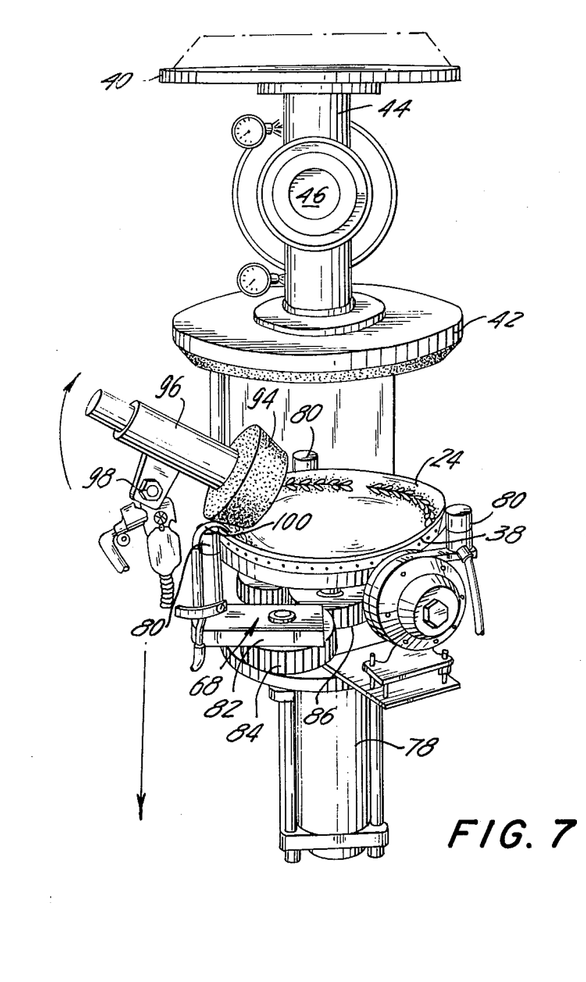
Figure 8:
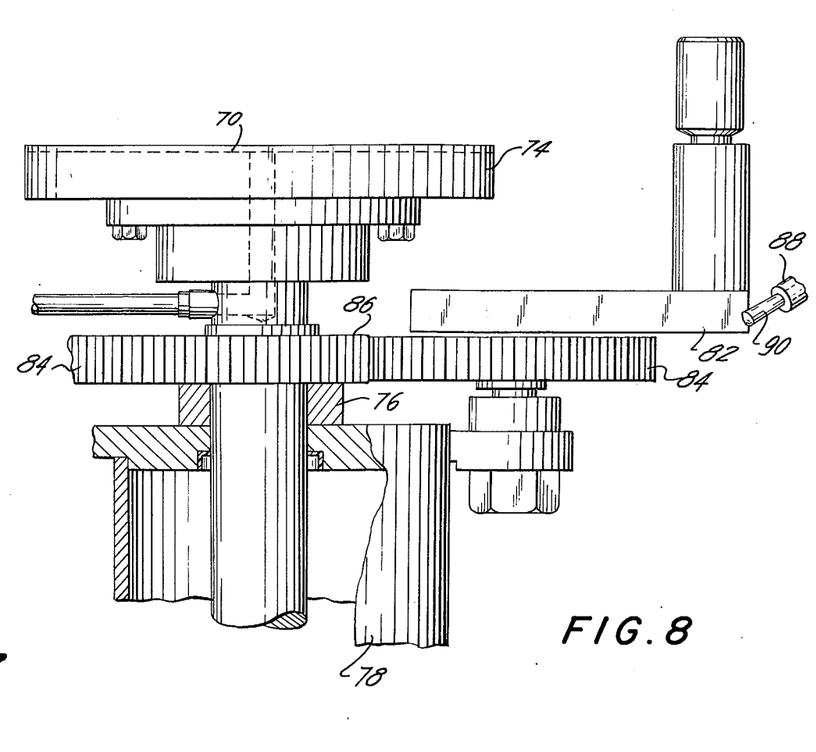

To move the decals from their supply stacks to the porous seating surface 26 (or 28 depending upon which seating surface is in the upper position), there is provided a third means designated 48 to affectuate the transfer. As best seen in the FIGS. 4A and 4B, the transfer means 48 comprises three porous pick-up heads 50 at least as large as the area of the arcuately shaped decals positioned therebeneath. As seen in the figures, the pick-up heads 50 are aligned along the circumference of a circle above the respective stacks of decals. By appropriate suction hoses and vacuum pump (not shown) the suction is applied to the rear of the porous pick-up head 50 for transferring the top most decal from each of the stacks of decals to their respective pick-up head 50.

Actually, this is accomplished in the instant invention by the operator lifting a pivoted handle 52 to which is linked the vertically movable shaft 54' (carried by a guide member 56' ) on the other end of which is provided the tray 18 carrying the decals 16. Thus when the operator lifts the handle 52', the tray of decals will be raised such that the top most of the stack will be brought into engagement with suction pick-up head 50. Also, and in a manner to be further described, it will be appreciated, that as the operator lifts handle 52' limit switch No. LS-1 is freed which causes certain events to take place like turning on the vacuum which is applied to the pick-up heads 50.

The pick-up heads 50 are carried by a spider-like framework 52 which is movable from a first position above the decals to a second position above the seating surface 26 (or 28). Such movement is effecutated by the operation of a conventional pneumatic cylinder 54 the output shaft 56 of which is pivotally connected at 58 to the arm 60 which carries the spider-like support 52.

Additionally, the pick-up heads 50 are also pivotally mounted at 62 such that each may pivot out of the common plane they reside in down into engagement with the tapered side surfaces 34 (or 36) of the frustroconically shaped seating surfaces 26 (or 28). To effect such pivotal movement of the pick-up heads 50, there are provided conventional pneumatic cylinders 64, the drive shafts 66 of which are connected to the pick-up heads 50 at a point remote from the pivoting axis 62.

It should initially be pointed out, and will be described in greater detail, that when the pick-up heads move from their initial position above the stack of decals to their left most position above the porous seating surfaces 26 (or 28), a second limit switch LS-2 is tripped to initiate the operation by which the pick-up heads 50 pivot down into engagement with the respective porous seating surface to effect transfer of the decals from the pick-up heads to the porous seating surface. As will become apparent from the detailed description of the control circuitry, the arrangement is such that the suction heads 50 do not release the decals (that is the vacuum is not removed) until the decals have been actually brought into contact with the porous seating surface 26 (or 28) which has itself a vacuum applied therebehind in the manner previously described. In this manner, there is no chance for the decals to loose their registration during this first transfer operation.

As explained previously, once the decals have been applied around the tapered side surface 34 of the porous seating surface 26, the cylindrical support member 44 is rotated 180° such that the seating surface 26 having the decals applied thereto now occupies the position formerly occupied by seating surface 28. In this manner, as will be presently described, the ware 24 may be brought up into engagement with the seating surface 26 while at the same time new decals may be transferred to the empty tapered side surface 36 of the seating surface 28. It will be appreciated that the use of the rotating decal holder, with the two seating surfaces, materially increases the production speed of the instant invention.

Continuing, fourth means 68 are provided for holding the piece of ware 24 to be decorated. Such holding means 68 includes a flexible seat 70 having an aperture 72 centrally therethrough by which a reduced pressure or vacuum may be applied to hold the ware 24 in proper position. The flexible seat 70 is carried on a plate 74 in turn carried on one end of a shaft 76 which may be operated between an up and down position by conventional piston type of pneumatic cylinder 78. Additionally, centering means are provided for centering the ware on the seat 70. The centering means includes centering pods 80 each of which is carried on a support pod 82 in turn carried by a gear 84 all geared to each other through a common floating gear 86 floating about the shaft 76. A conventional pneumatic cylinder 88 is provided the output piston shaft 90 of which is linked to one of the pods 82. It will be appreciated that when the shaft 90 moves the one centering pod 80, then by the gearing previously described, all centering pods will move toward the center to properly center the ware 24 on the seat 70.

Continuing with the sequence of operation, once the seating surface 26 has been rotated 180° to occupy the position previously occupied by seating surface 28, pneumatic cylinder 78 is operated to raise the shaft 76 and in turn the seat 70. This will bring the ware 24 into engagement with the seating surface 26 and, once the vacuum has been destroyed behind the seating surface 26, the decals will be transferred to the ware 24. Again, the proper registry of the decals is assured.

Thereafter, the cylinder 78 is operated to return the ware to its initial position. Preferably, once the ware has been returned to its initial position, a roller 94 carried on the end of a shaft 96 in turn pivoted at 98 is brought down into engagement with the lip of the ware and the ware rotated such that the roller will help to smooth the decals and eliminate any bubbles which have formed therein.

Finally, it will be appreciated that a common decal for instance of the heat release type, includes a backing paper which must be removed from the decal before the decal can be fired onto the ware. In the instant invention, after the aforedescribed rolling, air nozzles 100 are actuated to direct high pressure streams of air across the decals to cause the peeling off of the backing paper.

Thereafter, the ware may be removed from the machine 10 and further processed for example in a firing operation.

CONTROL SEQUENCE

The operator places a piece of ware 24 on the seat 70. The operator then turns on the vacuum pumps (not shown) for the seat 70, the seats 26, 28 and pick-up heads 50. These vacuum pumps operate at all times but are controlled by solenoids to be discussed below.

Assuming that the decal holder 14 is full of decals, the operator lifts the decal holder handle 52' manually so that the decals are raised high enough for the pick-up heads 50 to come into contact with the topmost decal in each stack.

Figure 9A:
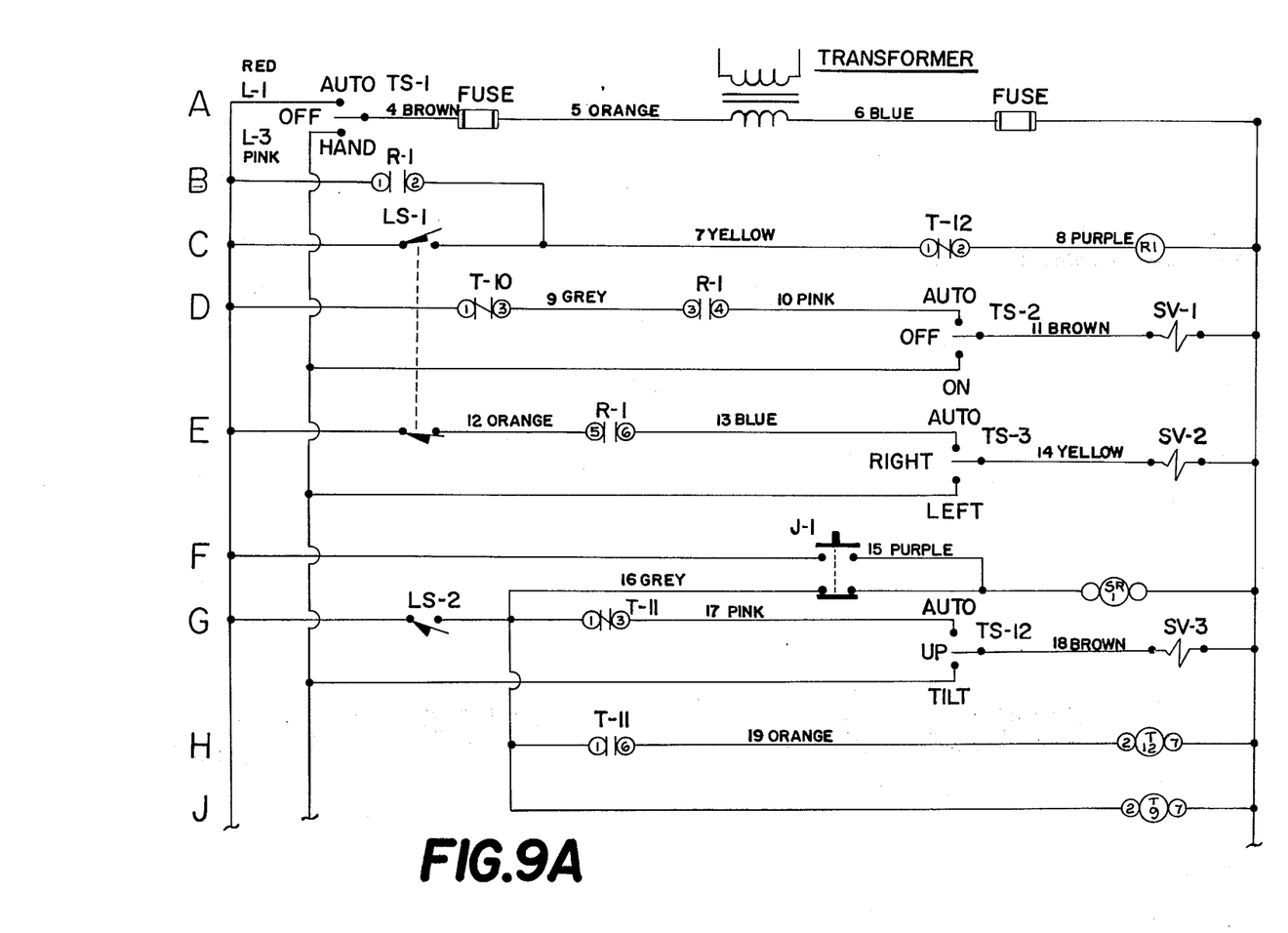
FIGS. 9A, 9B and 9C each show a portion of the control circuitry employed with the instant invention.
Figure 9B:
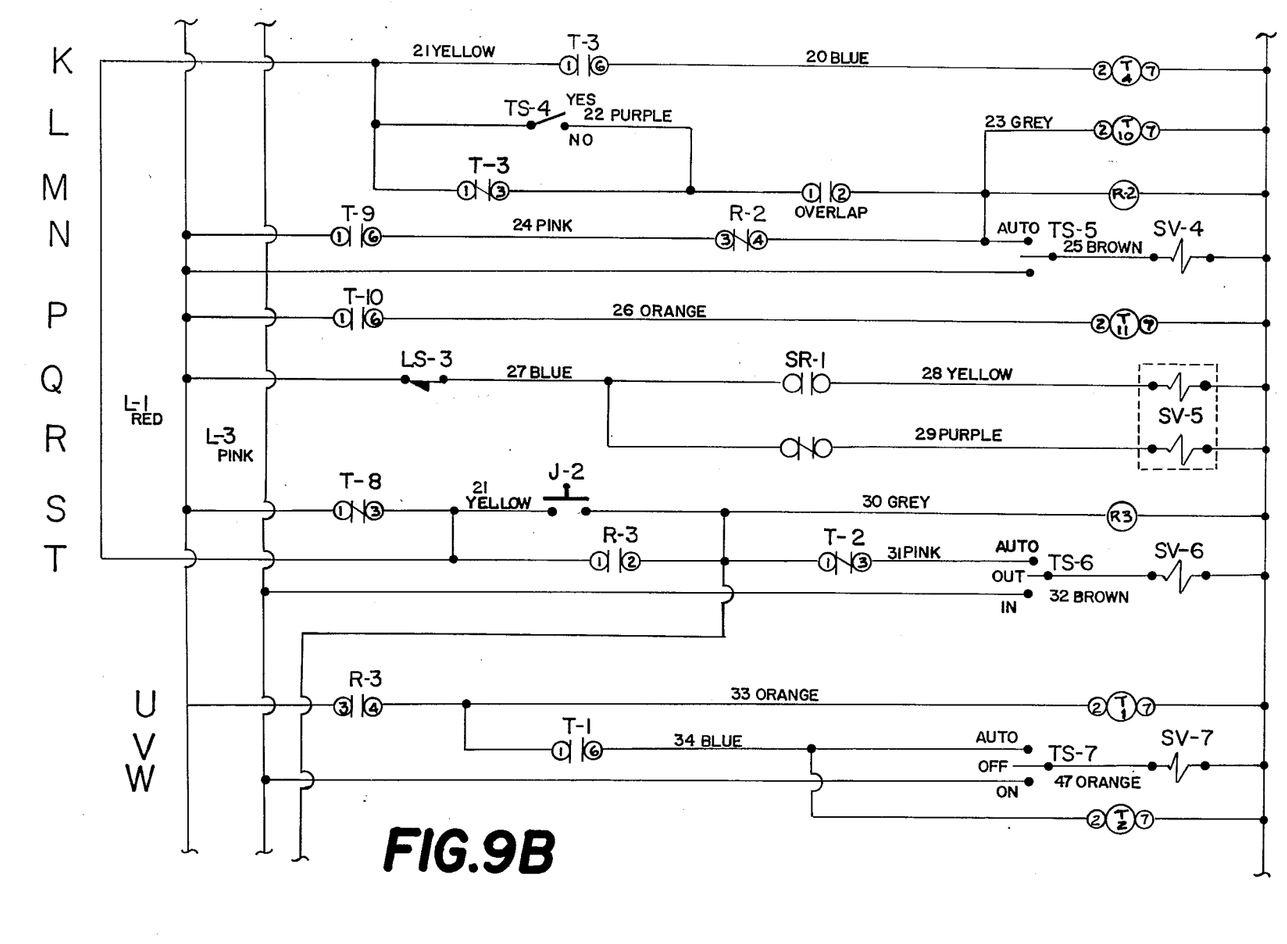
Figure 9C:
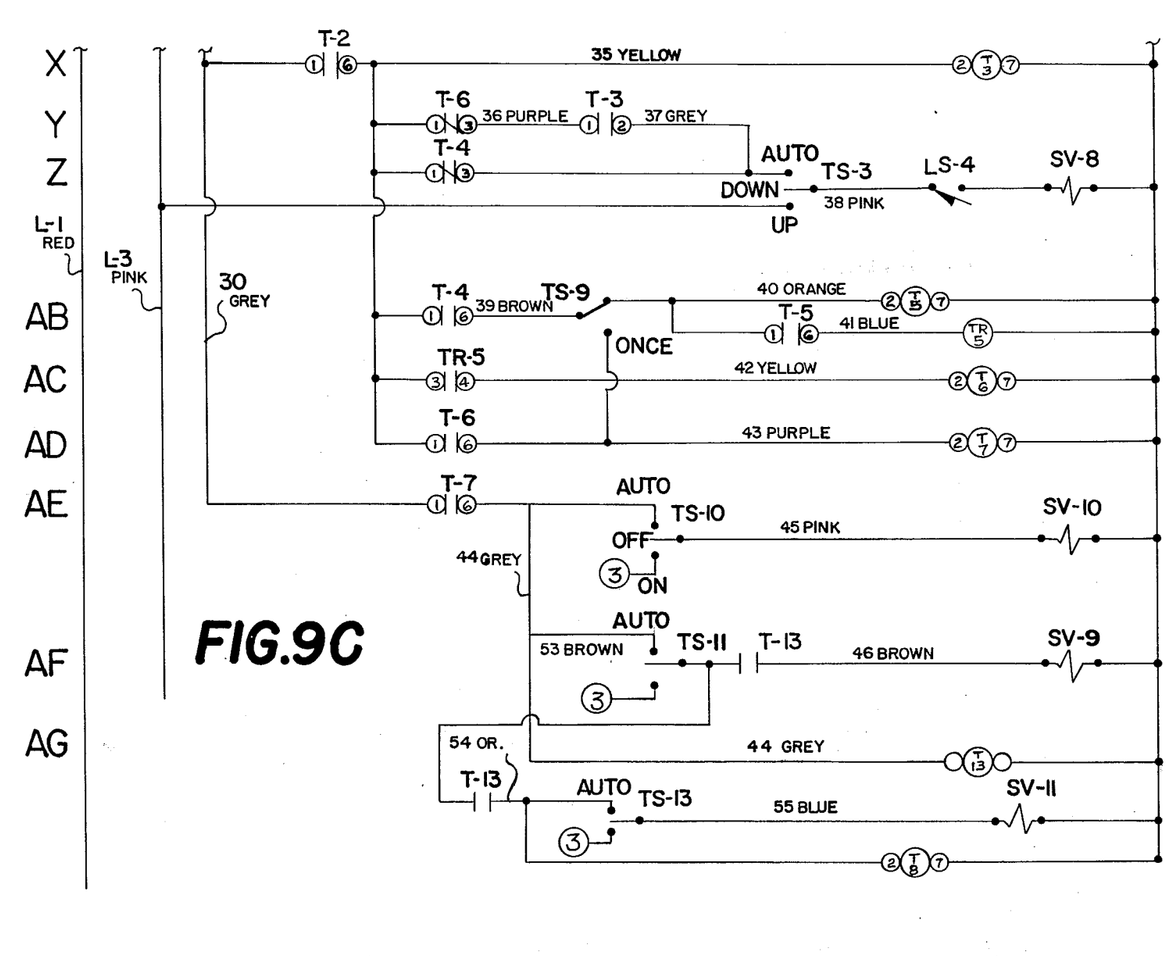

When the decal holder is raised, limit switch LS--1 is released. With reference to the control diagrams (FIGS. 9A, 9B and 9C), the normally closed held open side of LS--1 (see line C) makes contact and the pick-up head control relay R--1 (line C) is energized. The following things happen at this point of the cycle. In line B contacts R--$1_{1+2}$ closes and seals in R--1 coil. In line D contact R--$1_{3+4}$ closes and energizes the decal pick-up vacuum valve SV--1. In line E, contact R--$1_{5+6}$ closes for a purpose to be further described.

At this point, the decals 16 are now held to the pick-up head 50 by vacuum pressure.

As the operator lowers the decal holder 14, the normally open held closed side of limit switch LS--1 (see line E) is tripped and this energizes "pick-up head left" solenoid SV--2 through the now closed contacts R--$1_{5+6}$ in line E previously mentioned. The pick-up head 50 now moves to the leftmost position above the porous seating surface 26.

When the pick-up head 50 moves to the full left, limit switch LS--2 (line G) is tripped. The following functions happen at this point in time. In line G, LS--2 energizes stepping relay SR--1 and stepping relay SR--1 steps once. Also, SV--3 is energized through normally closed contacts of time T--1. Also in line J,T--9, a timer, is energized and starts timing.

When solenoid SV--3 is energized, the pick-up heads 50 are tilted down over the seating surface 26 as mentioned previously. This operation places the decals in contact with the seating surface 26 ready for complete placement thereon.

At this point, the decal seating surface vacuum "on" timer T--9 (in line J) times out, and the normally opened contact of T--9 (in line N) closes at the end of the length of time set on the T--9 timer. The following functions happen at this part of the cycle.

In line N, the decal seat vacuum valve SV--4 energizes such that the vacuum is applied behind the seating surface 26. Also, in line M the seating surface vacuum control relay R--2 is pulled in and held by the normally opened (overlap) contact R--$2_{1+2}$. It should be appreciated that this relay R--2 has a pair of overlap contacts R--$2_{1+2}$ and R--$2_{3+4}$ which prevents racing of the relay. Finally, in line L, the pick-up head vacuum release timer T--10 is energized and starts timing.

With reference to line L, when timer T--10 times out, the following operations happen at this point. First, with respect to line D, the normally closed contact of timer T--10 opens thereby deenergizing solenoid SV--1. This action releases the vacuum pressure on the decal pick-up segment 60 and permits the decals to release on to the seating surface 26. Also, with respect to line P the normally opened contact of timer T--10 closes and energizes the "raise pick-up head segment" timer T--11.

When timer T--11 times out the following happens. First, and with reference to line G, the normally closed contact of timer T--11 opens, thus deenergizing solenoid SV--3. This causes the pick-up heads 50 to return to their normal raised position in which they occupy a common plane. Also, with respect to line H, the normally open contact of timer T--11 closes, energizing the "pick-up head return to right" timer T--12.

After timer T--12 times out, the normally closed contacts of this timer T--12 opens and the following steps of the machine cycle take place.

With respect to line C, T--12 normally closed contact opens and deenergizes the pick-up head control relay R--1. Also with respect to line D, the R--$1_{3+4}$ contact opens. Finally, with respect to line E, the contact R---$1_{5+6}$ contact opens and lets the pick-up head 50 return to full right position over the supply of decals.

It will be appreciated that when the pick-up heads 50 retract to their initially rightmost position as seen in the drawings, limit switch LS--2 opens. When LS--2 opens, it deenergizes and drops out stepping relay SR--1 (line G), and resets the seating surface vacuum "on" timer T--9. Also the pick-up head "return to right timer" T--12 is reset for the next cycle.

When the pick-up heads 50 are fully retracted to the right, limit switch LS--3 is tripped. Limit switch LS--3 (in line Q) will energize turn-over solenoid SV--5 through one of the contacts of stepping relay SR--1. Energizing of solenoid SV--5 enables the seating surfaces 26 and 28 to turn over and position the decals in the proper position to be applied to the ware 24 that is to be decorated.

To transfer the decals from the seating surface 26 to the ware 24 the operator of the machine pushes the push button J--2 in line S. Of course, although this is illustrated as a mechanical push button, this sequence of operation can if desired be made to automatically follow the previous operation. In any event assuming a manual push button, when push button J--2 is depressed the following takes place. First, with respect to line S, the decal transfer control relay R--3 is energized, and sealed in by holding contacts R--$3_{1+2}$ (line T).

With respect to line T, the ware centering solenoid SV--6 is energized thus that the centering pods 80 may center the ware 24 in the manner previously described. Also, with respect to line U, the contact R--$3_{3+4}$ closes and energizes the seat vacuum "on" timer T--1.

When the timer T--1 times out, the following takes place. First, with respect to line V, the T--1 normally opened contact closes thereby energizing the seat vacuum solenoid SV--7. This permits the vacuum to be applied beneath the ware 24. At the same time, the "raise ware single timer" T-2 is energized.

When timer T--2 times out, the following takes place. First, with respect to line T the normally closed contact of T--2 opens, thereby deenergizing SV--6 such that the centering device opens. Also, with respect to line X, the normally opened contact closes and the ware seat 70 starts to go up towards its raised position, through T--4 normally closed contact (line Z). Also, this starts the timing of the seat vacuum release timer T--3.

When timer T--3 times out, the following happens. With respect to line K, the normally opened contact closes and energizes the seat spindle "lower" timer T--4. Also with respect to line M, the normally closed contact opens, deenergizing the seating surface vacuum control relay R--2. This resets timer T--10 and timer T--10 resets timer T--11. Also, with respect to line N, the normally closed contact also deenergizes the seating surface vacuum solenoid SV--4 thereby losing the vacuum pressure on the seating surface to permit the decals to be transferred to the ware.

When timer T--4 times out and with respect to line AB, the normally opened contact of T--4 closes, thereby energizing the start-ware-spindle rotation and "press roller in" timer T--7. Also with respect to line Z, the normally closed contact of T--4 opens, thereby deenergizing the "raise spindle solenoid" SV--8. At this time, the ware begins to retract to its initial lower position.

After the ware seat has been fully retracted to its lower position, the timer T--7 times out and the following occurs. With respect to line AE, the normally opened contact of timer T--7 closes energizing the ware-spindle-rotation solenoid SV--10; the "press roller in" solenoid SV--9; and the backup paper blow-off timer T--13.

Solenoid SV--10 upon energizing starts the ware spindle rotating by actuating an air motor not shown. Solenoid SV--9 operates a double-acting cylinder (not shown) that moves the press roller 94 into contact with the applied decals on the ware 24. With the rotation of the ware, the roller 94 applies pressure to smooth out the bubbles.

When timer T--13 times out the normally closed contact T--13 in line AF opens deenergizing the "press roller in solenoid" SV--9 and the roller 94 retracts out of the way. Also the normally opened contacts T--13 in line AG closes and the "backup paper blower-off solenoid" SV--11 energizes to allow jets of air from the nozzle 100 to blow the backing paper off the decals. This contact also starts the timing of T--8.

When timer T--8 times out, the blow off stops, and the ware seat 70 stops rotating. At this point all timers are reset for the next cycle of the machine and the R--3 contact (timed off-delay) opens and shuts off the ware seat vacuum. The cycle is complete and the operator removes the ware 24 and starts the next cycle.

From the above it will be seen that a completely automatic apparatus and novel method associated therewith are provided for applying decalcomania to a ware to be decorated thereby. Through the novel apparatus and method, decal registration is assured at all stages of transfer while at the same time rapid production is assured by the use of rotating intermediate seating surfaces which permits decals to be applied to a ware while at the same time new decals are being applied to the intermediate seating surface.

While this invention has been described with respect to a particular embodiment thereof, numerous others will become obvious to those of ordinary skill in the art in light thereof, and it is preferred, therefore, that the scope of the invention be limited, not by the specific disclosure herein, only by the appended claims.

We claim:

1. Apparatus for applying at least two decals to a piece of ware in a single decal transfer step; said apparatus comprising;

first means for holding a supply of decals, said first means comprising at least two storage bins;

second means for temporarily holding at least two preselectively shaped decals in a predetermined position with respect to the piece of ware to be decorated, said second means including a resilient porous decal seating surface for said decals, and vacuum means for applying a reduced pressure behind said porous decal seating surface;

third means for transferring said decals from said first means to said second means, said third means comprising at least two pick-up heads aligned above said stacks of decals, suction means applied to said pick-up heads for transferring the top-most decal from each of said stacks to a respective pick-up surface, position change means for moving said pick-up heads between an initial position above said stacks and a final position above said second means, and pick-up head movement means for moving said pick-up heads into contact with said second means, said pick-up head movement means including drive means for pivotally moving said pick-up heads between positions in a common plane and positions in engagement with said porous seating surface;

fourth means for holding the piece of ware to be decorated in a predetermined position with respect to said second means; and fifth means for moving said fourth means and said second means into decal transfer position with respect to one another whereby said decals may be simultaneously transferred from said second means to said piece of ware.

2. The apparatus of claim 1 wherein said decals are arcuately shaped and cooperate to establish an annular design ring around said piece of ware decorated thereby, and further wherein said storage bins are arranged along the circumference of a circle chosen in relationship to the diameter of said design ring.

3. The apparatus of claim 2 wherein said pick-up heads each has a pick-up surface at least as large as the area of said arcuately shaped decals, said heads being aligned along the circumference of said circle above said stacks of decals.

4. The apparatus of claim 1 wherein said third means includes suction means for holding said decals as they are transferred from said first means to a decal seating surface of said second means, and further including suction means control means for deactivating said suction means after said third means brings said decals into contact with said porous seating surface.

5. The apparatus of claim 4 wherein said piece of ware is in engagement with said porous seating surface of said second means when said fourth means and said second means are in decal transfer position with respect to one another; and further including vacuum means control means for deactivating said vacuum means after said piece of ware is in engagement with said porous seating surface.

6. The apparatus of claim 1 wherein said porous seating surface has an external configuration matched to the interior configuration of the piece of ware to be decorated.

7. The apparatus of claim 1 wherein said second means includes first and second porous seating surfaces positioned at opposite ends of a rotatable support member; and further including control means for rotating said support member a predetermined amount after said third means brings said decals into contact with one of said first and second seating surfaces.

8. Apparatus for applying at least two decals to a piece of ware including a flat central section and angularly oriented lip portion extending peripherally thereabout in a single decal transfer step, said decal comprising arcuately shaped decals which cooperate to establish an annular design ring around said piece of ware; said apparatus comprising:

first means for holding a supply of decals, said first means comprising at least two storage bins arranged with respect to one another, to store stacks of said arcuately shaped decals along the circumference of a circle chosen in relationship to the diameter of said design ring;

second means for temporarily holding at least two preselectively shaped decals in a predetermined position with respect to the piece of ware to be decorated, said second means including a resilient porous decal seating surface for said decals, and further including vacuum means for applying reduced pressure behind said porous seating decal surface, said porous seating surface being frustroconical in shape, and including a flat central portion and a peripheral side portion angularly tapered to match the angular orientation of said lip portion of said piece of ware;

third means for transferring said decals from said first means to said second means, said third means comprising at least two pick-up heads aligned above said stacks of decals, suction means applied to said pick-up heads for transferring the top most decals from each of said stacks to a respective pick-up surface, position change means for moving said pick-up heads between an initial position above said stacks and a final position above said second means, pick-up movement means for moving said pick-up heads into contact with said second means, and suction means control means for deactivating said suction means after said pick-up head movement means has moved said pick-up heads into contact with said porous seating surface, said pick-up head movement means including driving means for moving said pick-up heads between positions in a common plane and positions in engagement with said angularly tapered side portion of said frustroconically shaped porous seating surface;

fourth means for holding the piece of ware to be decorated in a predetermined position with respect to said second means; and fifth means for moving said fourth means and said second means into decal transfer position with respect to one another whereby said decals may be simultaneously transferred from said second means to said piece of ware.

\* \* \* \* \*